June 9, 1936.  J. HANDLEY ET AL  2,043,511

INDICATOR

Filed Sept. 4, 1935  3 Sheets-Sheet 1

June 9, 1936.  J. HANDLEY ET AL  2,043,511
INDICATOR
Filed Sept. 4, 1935  3 Sheets—Sheet 2

Patented June 9, 1936

2,043,511

UNITED STATES PATENT OFFICE 2,043,511

INDICATOR

John Handley, Claude Suckling, and Robert Henry Suckling, London, England

Application September 4, 1935, Serial No. 39,182
In Great Britain July 9, 1934

3 Claims. (Cl. 40—52)

This invention relates to improvements in indicator devices for use, for example, in connection with totalizator and like counting machines, but applicable also to other purposes.

An indicator device constructed in accordance with the present invention comprises a panel consisting of a plurality of pivoted indicator elements adapted to be reversed in predetermined groups with the selected indicator elements of each selected group arranged in the form of a numeral, letter, or other symbol to be exhibited.

Figure 1:
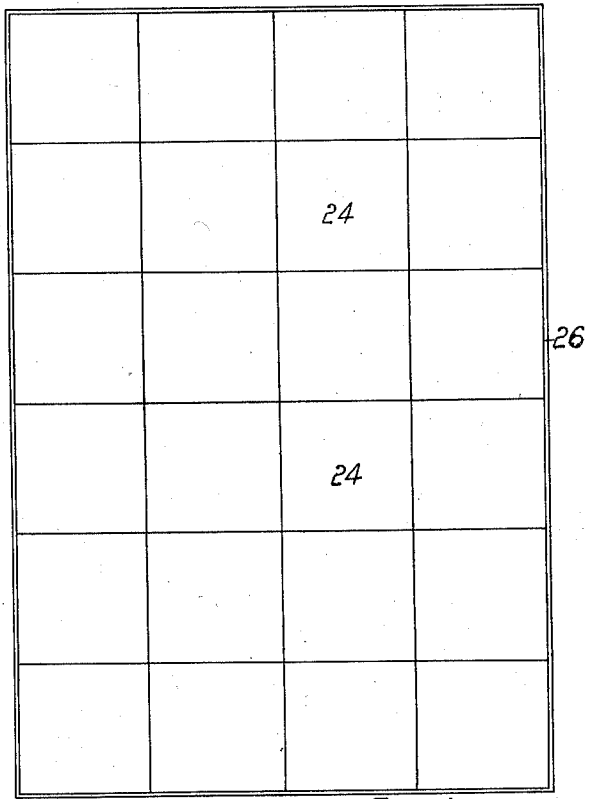
Figure 4:
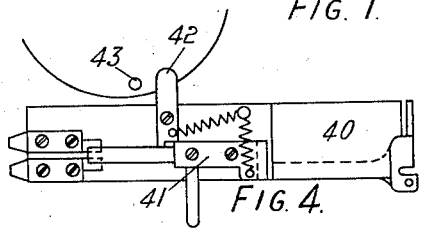
Figure 5:
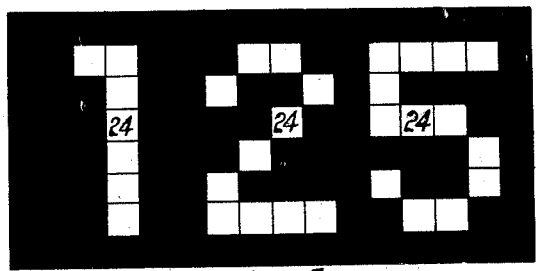
Figure 2:
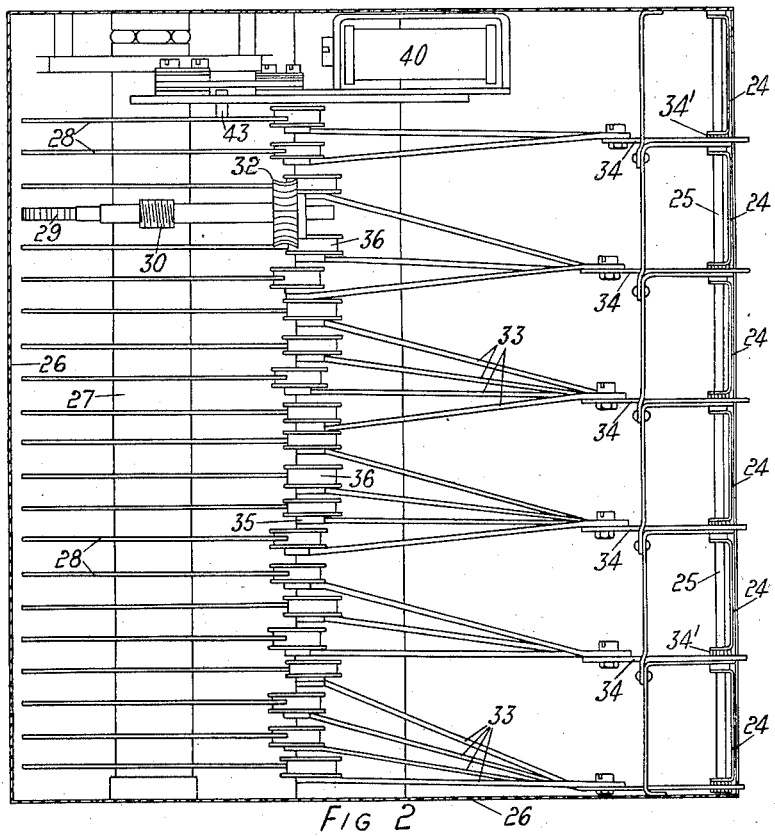
Figure 3:
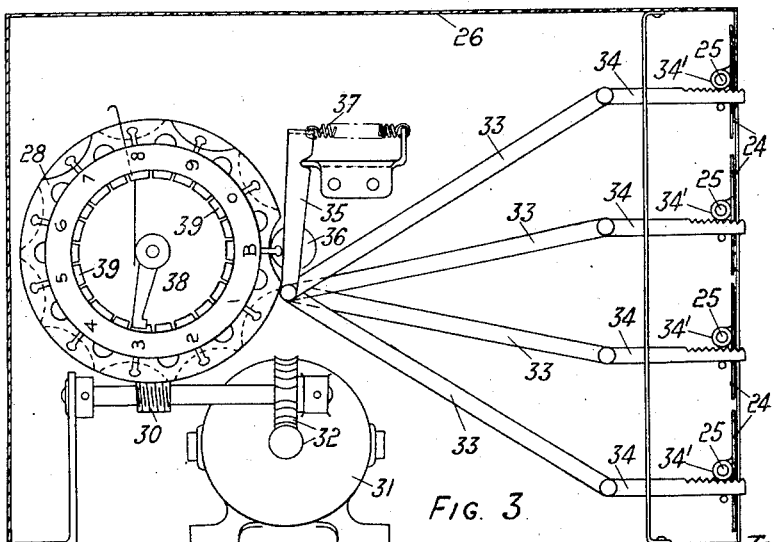
Figure 6:
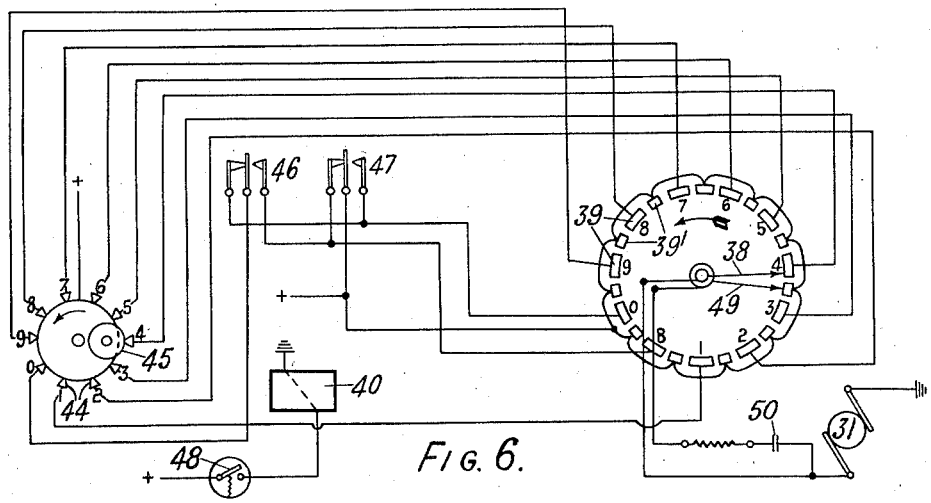

An indicator device constructed in accordance with the present invention is illustrated in the accompanying drawings in which Fig. 1 is a front elevation, Fig. 2 a vertical section at right angles to Fig. 1, Fig. 3 a horizontal section, Fig. 4 a fragmentary detail plan view, and Fig. 5 a front elevation showing three indicator panels. Fig. 6 is a conventional diagrammatic view to show the electric circuits.

The indicator device shown includes a panel consisting of twenty-four pivoted reversible indicator elements 24 in the form of rectangular plates arranged in four vertical rows each including six plates, i. e., the panel is six elements high by four elements wide.

The indicator elements 24 of each vertical row are mounted for pivotal movement about a vertical axis on a vertical spindle 25, each indicator element 24 being rotatable through 180° about the axis of the respective spindle 25 so that its rear face may be presented to the front of the panel when required. In order that the rear faces of the indicator elements 24 shall contrast sharply with their front faces, we may, for example, paint the front faces black and the rear faces white.

For effecting reversal of the indicator elements 24 in predetermined groups each representative of a numeral there is provided within a casing 26 of which the indicator elements 24 form the front panel or wall, mechanism including a cam-shaft 27 rotatable about a vertical axis and carrying twenty axially spaced cams 28, and a worm wheel 29 meshing with a worm 30 driven by an electric motor 31 through worm gearing 32. Each of eighteen of the cams 28 is adapted to operate an indicator element 24 through a link 33 one end of which is operatively connected to a rack 34 meshing with a pinion 34' on the respective indicator element 24 and the other end of which is pivotally connected to a lever 35 carrying a cam-follower 36 and urged by a spring 37 in the direction to maintain the follower 36 in engagement with its cam 28. The two inner indicator elements 24 of the top horizontal row are operable together, by a single cam 28, and the two outer indicator elements 24 of this row are operable together, by another single cam 28. The second indicator element from the left in the second row and the second indicator element from the left in the fifth row from the top are idle in the construction illustrated. Thus, twenty cams 28 suffice for the operation of the twenty-two operable indicator elements 24. Rotatable with the cam-shaft 27 is a selector switch member 38 movable, in the rotation of the cam-shaft 27, over a ring of fixed contact segments 39, the switch member 38 and the contact segments 39 being in circuit with the motor 31. The cam-shaft 27 has eleven angular settings represented by the numerals 0, 1, 2, 3, 4, 5, 6, 7, 8, 9 and by the letter B in Fig. 3. The cams 28 are so arranged on the cam-shaft 27 that, as the switch member 38 is brought into register with any of the numerals 0–9, the indicator elements 24 of a group are reversed so as to exhibit in white on the panel the corresponding numeral, as shown, for example, in Fig. 5, in which figure three panels are juxtaposed in order to exhibit three digits. When the switch member 38 is brought opposite the letter B, the panel is made blank, that is, all the indicator elements 24 are disposed in normal or unreversed position. Arrest of the cam-shaft 27 at the proper setting is effected by making the appropriate contact segment 39 electrically dead, so that the motor 31 is stopped when the switch member 38 engages the dead contact segment, the motor remaining stopped only so long as said contact segment remains dead.

The contact segment 39 corresponding to the eleventh angular setting of the cam-shaft 27, i. e., the contact segment radially opposite B, may be normally connected to the positive line of a D. C. supply. When zero segment 0 is made dead, the segments representing the numerals 1–9 are alive, so that the cam-shaft 27 will be rotated until the switch member 38 engages the zero segment 0. In order now to restore the cam-shaft 27 to B or blank setting, B segment is made dead and 0 segment is made alive. This change over is effected by exciting an electro-magnet 40 the armature 41 of which is displaced to effect reversal of the connections to the B and 0 segments, whereupon the cam-shaft 27 rotates to blank setting, the B segment being dead. A spring-urged pawl 42 holds the armature 41 in displaced position until a striker 43 rotating with the cam-shaft 27 trips the pawl 42 and allows the armature 41 to return to normal position.

The contact segments 39 corresponding, respectively, to the numerals 0–9 are included in the individual circuits including also circuit-breaker contacts 44 (Fig. 6) numbered in correspondence with the segments 39 and operable by a rotary follower 45 constituting a component of an instrument controlling the indicator device. The follower 45 in its rotation engages the circuit-breaker contacts 44 and makes the contacts 39 dead in succession, any one contact 39 remaining dead only so long as the follower 45 is in engagement with the corresponding contact 44. 46 47 denotes the change-over switches controlled by the electro-magnet 40, for effecting the reversal of the connections to the B and 0 segments of the segments 39, the electro-magnet 40 being excitable by closure of a switch 48. Electrically interconnected contact segments 39', alternating with the segments 39, and a wiper 49 following the switch member 39, are provided, so that the wiper 49 feeds a condenser 50 each time the motor circuit is interrupted.

What we claim is:—

1. An indicator device comprising a panel consisting of a plurality of pivoted indicator elements reversible in predetermined groups, each group of which represents a symbol in contrast with the unreversed elements, an electric motor for actuating the said indicator elements, a cam shaft adapted to be driven by said motor, cams on said shaft for operating the indicator elements, and a selector switch including a movable switch member driven by and controlling said motor.

2. An indicator device as claimed in claim 1 including levers operatively connected to the indicator elements, followers on said levers engageable by the cams, pinions on the indicator elements, racks engaging said pinions, and links connecting said racks with said levers.

3. An indicator device as claimed in claim 1 including a series of contacts engageable by the switch member in the operation of the motor, and electro-magnetically operated means for reversing the connections to two contacts of the series.

JOHN HANDLEY.
CLAUDE SUCKLING.
ROBERT HENRY SUCKLING.